United States Patent [19]

McKewan

[11] 4,430,033
[45] Feb. 7, 1984

[54] SHEET METAL INSERT FOR FOAM PLASTIC

[75] Inventor: Arthur J. McKewan, Rochester, Mich.

[73] Assignee: Microdot Inc., Darien, Conn.

[21] Appl. No.: 256,566

[22] Filed: Apr. 22, 1981

[51] Int. Cl.³ ............................................ F16B 13/06
[52] U.S. Cl. ...................................... 411/61; 411/74; 411/177; 411/180; 411/437
[58] Field of Search ..................... 411/60, 61, 74, 176, 411/177, 180, 437

[56] References Cited

U.S. PATENT DOCUMENTS 2,400,142 5/1946 Tinnerman .............................. 411/61
3,910,156 10/1975 Soltysik .................................. 411/61

FOREIGN PATENT DOCUMENTS

Ad.13635 10/1887 United Kingdom .................. 411/74
741793 12/1955 United Kingdom .................. 411/60

Primary Examiner—Wayne L. Shedd
Attorney, Agent, or Firm—Lyman R. Lyon

[57] ABSTRACT

A one-piece sheet metal insert for use in anchorage and fastening applications. The insert is designed to provide sufficient resistance to axial pull-out loading when utilized in relatively soft material workpieces such as structural foam plastic. The insert is also configured to take the clamp load between its collar and internal thread ribs thereby preventing tensile and compressive forces from being applied to the workpiece material surrounding the insert which commonly cause creep to occur.

1 Claim, 7 Drawing Figures

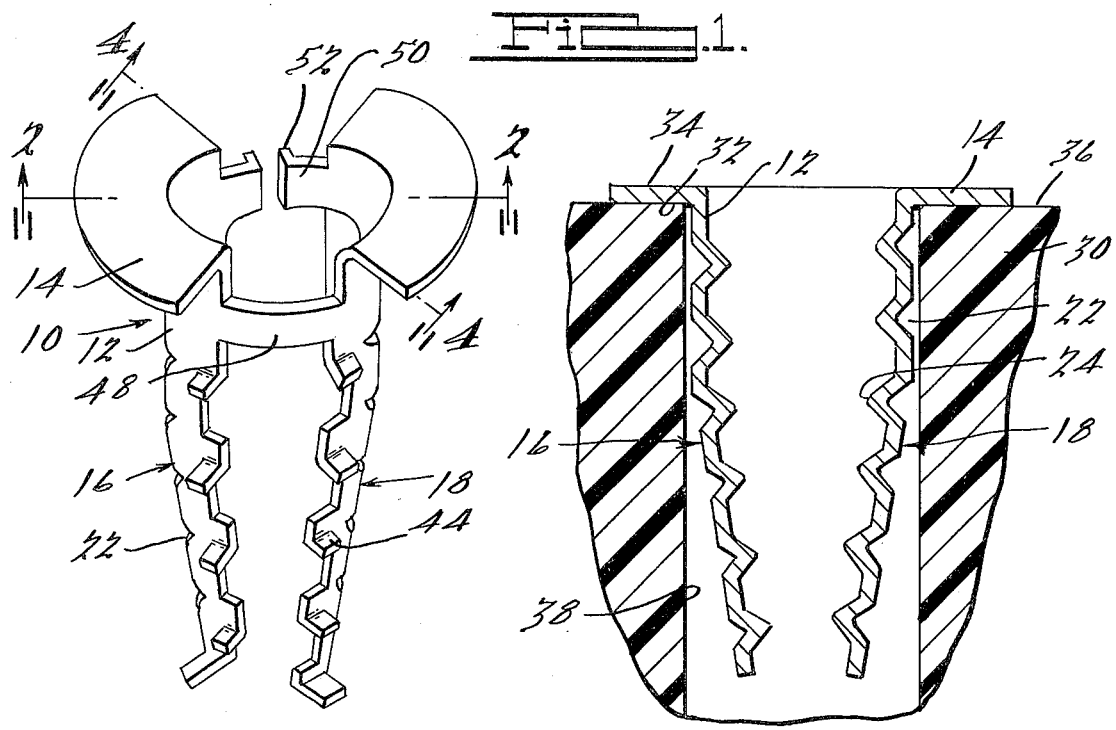
Fig. 1.
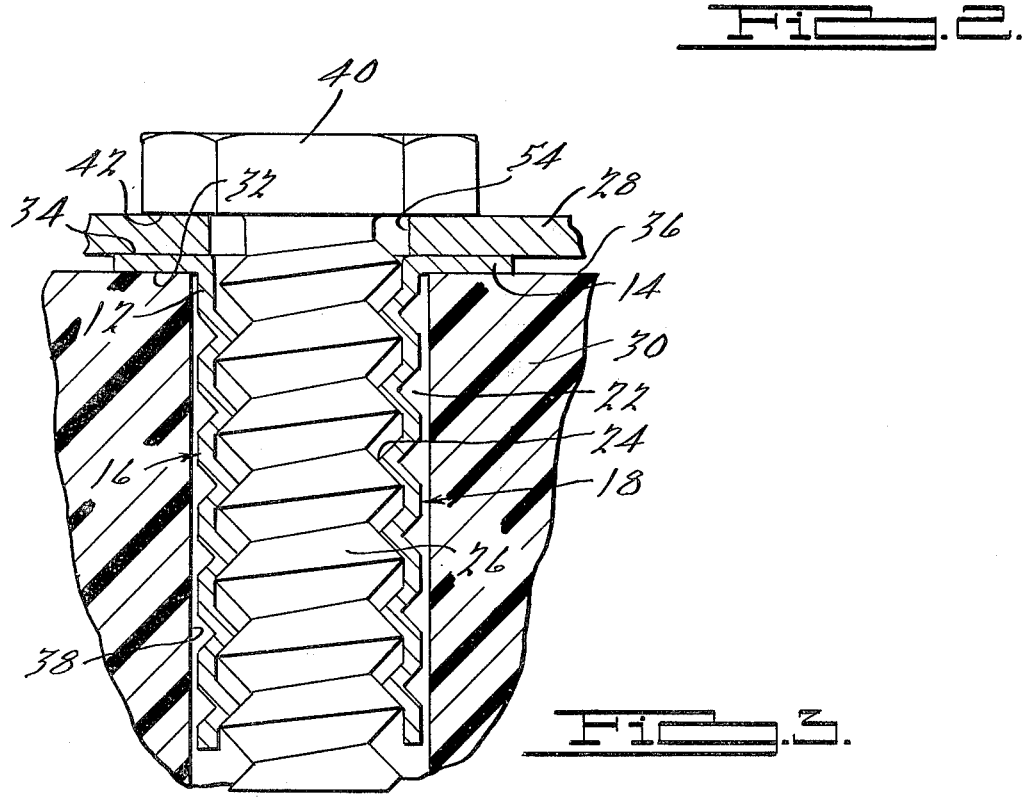
Fig. 2.
Fig. 3.

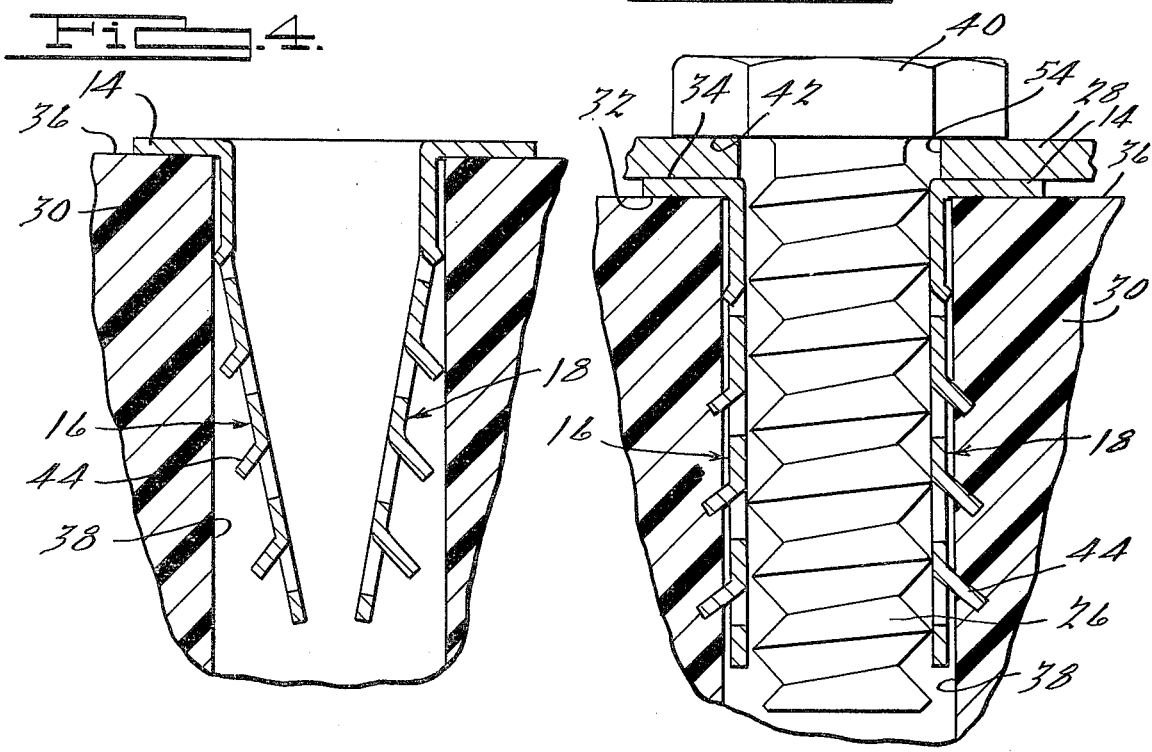
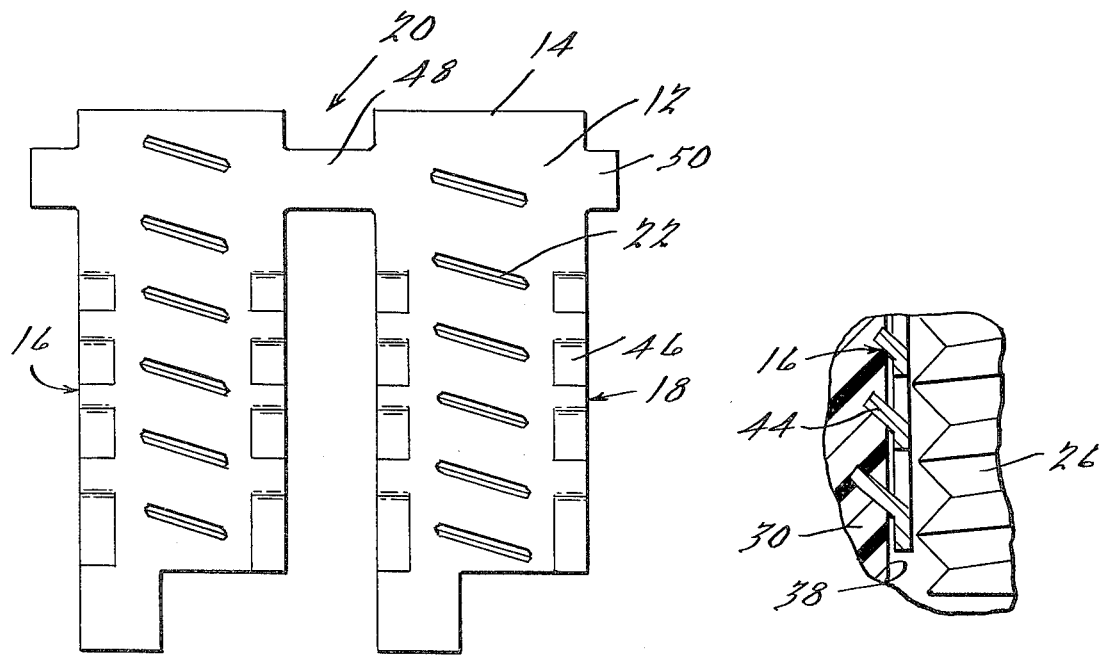

SHEET METAL INSERT FOR FOAM PLASTIC

BACKGROUND AND SUMMARY OF THE INVENTION

The present invention relates to fastener inserts or anchors and more particularly, to a sheet metal insert distinctly suited for use in structural foam plastic and other relatively soft material anchorage applications. The sheet metal insert is internally threaded and is adapted for insertion in a preformed hole in a workpiece to receive a standard type screw with an externally threaded shank. The respective threads of the insert and shank engage each other for the purpose of securing a part or other member to the workpiece of relatively soft material in which the sheet metal insert is fitted.

In the present age of advanced technology, there is an increasing requirement for usage of strong, lightweight materials in structural workpiece applications. One such material is structural foam plastic which can be manufactured from any suitable thermoplastic to which a foaming agent has been added, thereby increasing its volume by a substantial percentage. The structural foam plastic produced from this process often has a dense skin of approximately 0.010 to 0.030 of an inch in thickness. The material of the structural foam plastic becomes less dense as the center of the workpiece is reached.

Prior known types of fasteners or anchorage devices possess certain disadvantages when utilized with advanced relatively soft structural materials. A resultant compressive load is applied to the plastic workpiece when a screw or fastener is tightened or clamped. This compressive load causes the plastic material of the workpiece to creep in a relatively short period of time, thus substantially decreasing the clamp load and torque applied by the screw or fastener. This creeping action causes the fit between the workpiece and the part or member fastened thereto to become loose, structurally unsound, and thus wholly unsatisfactory.

There have been various known fastening or anchorage proposals that have incorporated sleeves or inserts with portions that could be displaced outwardly from within a preformed hole to dig or bite into the surrounding material, such portions being generally in the form of equal sized teeth or other projections. The disadvantage of such prior proposals is that it has been found that the resistance to axial pull-out or loosening provided by the teeth or other projections alone engaging the material is often not sufficient. This disadvantage is greatly magnified when the sleeves or inserts are utilized in soft materials such as structural foam plastic, where the density of the material decreases proportionally towards the center of the workpiece.

Many known sleeves or inserts also are constructed of relatively expensive materials, are complicated to make, incorporate several pieces, and hence are expensive to produce.

It is, therefore, desirable to provide an insert for anchoring a screw or fastener in relatively soft material that is specifically designed to prevent creep in the workpiece material when a compressive load is applied. It is additionally desirable to provide an insert that is specifically designed to maintain satisfactory resistance to axial pull-out or loosening when utilized in structural foam plastic type workpiece applications where the density of the material decreases proportionally towards the center of the material. It is moreover desirable to provide an insert which can be simply, efficiently, and economically produced, as well as installed using conventional methods.

The sheet metal insert of the present invention can be produced in a stamping process from a one-piece blank. The stamped piece can then be formed to its final configuration as a substantially circular insert.

The sheet metal insert includes a cylindrical body portion with a collar at one end that rests on the surface of the foam plastic workpiece and provides a first clamping face for joining a member to the workpiece. A first and second leg extend downward from the other end of the body portion, each leg having a series of inwardly and diagonally projecting indents or ribs that serve as the internal threads of the insert. On each side of the first and second legs, a series of protrusions or tangs project outwardly to form an angle with the legs. The sheet metal insert is designed so that each successive tang away from the collar projects further outward from the leg while maintaining the same angle with the leg. These progressively longer tangs compensate for the less dense material towards the center of the structural foam workpiece. The first and second legs are also deformed inwardly towards the axis of the insert so that the progressively longer tangs do not interfere with installation of the insert in the preformed hole of the workpiece.

When the insert is put into a cored or drilled hole, and a screw or other externally threaded stem is driven into the insert, the end of the screw, upon coming into engagement with the deformed legs, will deflect or push the legs outwardly, causing the tangs to bite into the plastic or foam material of the workpiece surrounding the hole.

The head of the screw defines a second clamping face that coacts with the first clamping face of the insert collar to clampingly engage and load opposite faces of the member desired to be fastened to the workpiece. The sheet metal insert of the present invention is designed so that the clamp load is taken between the internal thread ribs and the collar of the insert. In this manner, there is no resultant compressive or tensile force applied to the structural foam workpiece by the insert and hence creep will therefore not occur.

The above and other features of the invention will become apparent from a reading of the detailed description of the preferred embodiments, which makes reference to the following set of drawings.

BRIEF DESCRIPTION OF THE DRAWINGS

FIG. 1 is a perspective view showing the sheet metal insert in accordance with the present invention prior to installation.

FIG. 2 is a sectional view taken along the line 2—2 of FIG. 1, showing the sheet metal insert in installed relationship with a workpiece.

FIG. 3 is a view similar to FIG. 2 showing the sheet metal insert in assembled relationship after a screw has been inserted to clamp a member to a workpiece.

FIG. 4 is a sectional view taken along the line 4—4 of FIG. 1, showing the initial installation relationship of the tangs of the sheet metal insert in a workpiece.

FIG. 5 is a view similar to FIG. 4 showing the sheet metal insert in assembled relationship after a screw has been inserted to clamp a member to a workpiece.

FIG. 6 is an elevational view showing a sheet metal insert blank in a phase of its manufacture.

FIG. 7 is a view similar to FIG. 5 showing a partial sectional view of the assembled sheet metal insert in accordance with a second embodiment of the invention.

DETAILED DESCRIPTION OF THE PREFERRED EMBODIMENTS

Referring now to the drawings, the sheet metal insert in accordance with the present invention is shown in FIG. 1 at 10. The sheet metal insert 10 (hereinafter "insert 10") includes generally a body portion 12, a collar 14, a first leg 16, and a second leg 18, the features and functions of which will be described more fully hereinafter.

As shown in FIG. 6, insert 10 may be initially formed from a stamping 20 that is produced by a stamping process from a relatively thin blank of metal that has the suitable properties of long life, strength, malleability, and economy. During the stamping processes, indents 22 are formed in legs 16 and 18 and disposed in a substantially diagonal direction in relation to legs 16 and 18. As shown in FIGS. 2 and 3, the formation of indents 22 creates corresponding projections or ribs 24 on the other side of blank 20. When stamping 20 is rolled or bent around a mandrel to form insert 10, ribs 24 result on the inside of insert 10 and serve as internal threads within insert 10 to receivingly engage a standard screw or other similar externally threaded stem 26 in assembling or fastening a member 28 to a workpiece 30.

The collar 14 of insert 10 lies perpendicular to legs 16 and 18 and contains a lower face 32 and an upper face 34. Lower face 32 rests on a surface 36 of workpiece 30 and serves to control how far insert 10 is placed within a preformed hole 58. Screw 26 includes a head 40 that acts as a top clamping face 42 to coact with upper face 34 and clampingly engage and load opposing sides of member 28. The resultant clamp load on insert 10 is taken between internal thread ribs 20 and collar 14.

As depicted in FIGS. 4 and 5, insert 10 is anchored in workpiece 30 by a series of projections or tangs 44. Tangs 44 are formed on each side of legs 16 and 18 during the stamping process by punching small, rectangular tabs 46 along the sides of legs 14 and 16 and bending tabs 46 outward and upward to form and open an acute angle in relation to the legs from the downward end of legs 16 and 18. Tangs 44 are formed to be progressively longer as they proceed down legs 16 and 18 by making corresponding rectangular tabs 46 progressively longer.

As described above, insert 10 is designed and manufactured so that each successive set of tangs 44 from collar 14 project correspondingly further outwardly from legs 16 and 18. These increasingly longer tangs 44 compensate for the decreasing density of the material in workpiece 30 surrounding preformed hole 38 and thus provide a uniform resistance to axial pull-out loading. First and second legs 16 and 18 are also deformed inwardly towards the axis of insert 10 so that the progressively longer tangs 44 do not interfere with installation of insert 10 in preformed hole 38. Legs 16 and 18 are deformed so as to leave at least 2 ribs on each side of insert 10 and near collar 14 on the undeformed portion of insert 10.

When insert 10 is placed within preformed hole 38 and screw 26 is driven into insert 10, the end of screw 26 upon coming into engagement with inwardly deformed legs 16 and 18, will deflect legs 16 and 18 outward, causing tangs 44 on legs 16 and 18 to bite and embed into the relatively soft wall material of workpiece 30 surrounding preformed hole 38. As legs 16 and 18 are displaced outwardly, tangs 44 move in an arc-like direction which, because of the acute angles that tangs 44 form with legs 16 and 18, pulls insert 10 downwardly thereby pulling collar 14 firmly into abutting contact with surface 36 of workpiece 30.

As shown in FIGS. 1 and 6, insert 10 also includes a connection portion 48 that connects legs 16 and 18 near collar 14 and an extension 50 that extends or projects circumferentially from the side of each leg 16 and 18 away from connection portion 48 in the same plane or planes as connection portion 48. A portion of extension 50 is bent perpendicularly outward to form an anti-rotation flange 52.

Anti-rotation flange 52 serves to prevent insert 10 from being rotated when screw 26 is being driven into insert 10. When insert 19 is installed in preformed hole 38, anti-rotation flange 52 bites into the material of workpiece 30 near surface 36 and prevents the high torque that is exerted on insert 10 from causing insert 10 to rotate within preformed hole 10. The high torque results from the force required to drive screw 26 so that it displaces tangs 44 outwardly and causes tangs 44 to bite into the material of workpiece 30 surrounding preformed hole 38. The rotation of insert 10 that would result without anti-rotation flange 52 is undesirable because it would cause tangs 44 to cut annular grooves in the workpiece material surrounding preformed hole 38 and thus prevent insert 10 from being firmly and securely held in workpiece 30.

FIG. 7 illustrates an alternative embodiment of the present invention wherein tabs 46 are punched so as to enable them to be bent outward and upward. Tangs 44 are thus formed to open and form an acute angle with the legs from the upward end of legs 16 and 18. In this manner, tangs 44 bite into the material of workpiece 30 surrounding preformed hole 38 in a direction substantially perpendicular to the direction of bite in the foregoing preferred embodiment. In this manner, tangs 44 engage the material of workpiece 30 to provide an even greater resistance to axial pull-out loading.

It should be noted that in both of the aforementioned embodiments depicted in FIGS. 5 and 7, while the angle that tangs 44 form with respect to legs 16 and 18 is described as being acute, tangs 44 can also be formed to project substantially perpendicularly from legs 16 and 18 to achieve the greatest penetration or bite into the material of workpiece 30 surrounding preformed hole 38.

To utilize insert 10, a hole is drilled or cored in a workpiece to which anchorage or fastening is desired. Insert 10 is then placed in this preformed hole 38 so that anti-rotation flange 52 bites into surface 36 of workpiece 30 and collar 14 of insert 10 engages surface 30 of the workpiece. Thereafter, a member 28 desired to be assembled or fastened to workpiece 30 is placed with a corresponding hole 54 over workpiece 30 and insert 10. Screw 26 is advanced through holes 52 and 38 until the threaded shank of screw 26 engages deformed legs 16 and 18 of insert 10. Screw 26 is then driven into insert 10 causing legs 16 and 18 to be displaced outwardly, thereby in turn, causing tangs 44 of legs 16 and 18 to bite into the material of workpiece 30 surrounding preformed hole 38. By varying the length of screw 26, members 28 of various thicknesses can be accommodated.

Once installed and assembled, sheet metal insert 10 provides a distance advantage over prior known anchorage sleeves and inserts when utilizing workpieces of structural foam plastic or other similar relatively soft material. Such prior structures, when tightened, exert compressive and tensile loads at various places in the workpiece, causing the soft material to "creep" in a relatively short period of time. As the material of the workpiece "creeps", the clamp load and torque applied by the screw and insert decrease, causing the connection made between the workpiece and member to be rendered unsatisfactory.

Insert 10 avoids this problem by providing an anchoring device having an integral collar and internal thread ribs that absorb the clamp load when the screw is tightened. Insert 10 therefore does not itself apply any tensile or compressive forces to the workpiece. Creep, then, will not occur. Accordingly, insert 10 performs in many ways like a fixed nut; the collar of insert 10 provides the clamping face much in the same way that a nut does.

Prior art anchorage sleeves and inserts, besides being expensive to form and produce, also have proved to be unsatisfactory when used in applications utilizing workpieces of relatively soft material, especially materials whose density decreases towards the center of the workpiece. In such materials, the resistance to axial pull-out loading provided by the teeth of prior art devices has proven to be unsatisfactory.

Insert 10 also avoids this problem by utilizing tangs 44 that are progressively longer in proportion to the distance from collar 14 and hence compensate for the less dense material in, for example, structural foam. In this way, the decrease in material density is taken into account by the progressively longer tangs 44 which bite progressively further into the material, thus providing a substantially constant resistance to axial pull-out along the entire length of insert 10.

Insert 10 can be efficiently formed as stamping 20 in the following manner. Commencing with a blank of appropriate size that can be cut off from a long strip of sheet metal, such blank can be passed to a suitable machine where it can be located by its edges for the stamping actions of cutting and pressing tools acting upon the blank. The cutting and pressing tools act to form body portion 12, collar 14, and hence first and second legs 16 and 18, indents 22, ribs 24, tangs 44, collar 14, connection portion 48, and extensions 50. A portion of extension 50 is bent perpendicularly outward to form antirotation flange 52.

As depicted in FIG. 6, tangs 44 are made progressively longer by increasing the rectangular length of the tabs 46 along the edges of legs 16 and 18. Tangs 44 are displaced outward by appropriate tools to form an angle that opens with respect to the bottom of legs 16 and 18.

Indents 22 and thus ribs 24 are formed by male and female die components that cold flow the material of the insert blank during a pressing process. Indents 22 and ribs 24 are formed in a substantially diagonal direction in relation to the insert blank to correspond to appropriate internal threads of insert 10 for receiving a standard type externally threaded screw.

Stamping 20 as formed is then rolled about a suitable mandrel where radially acting tools may be advanced to engage legs 16 and 18 and deform them inwardly along the axis of said insert so that tangs 44 will not interfere with installation of insert 10 in preformed hole 38.

In addition to the above-noted features, the present invention, then, relates to a sheet metal insert 10 that is designed and configured to provide sufficient resistance to axial pull-out loading when utilized in relatively soft material applications such as structural foam plastic in which the density of the material decreases proportionally with the distance from the material surface. The sheet metal insert also allows the clamp load to be taken between the internal thread ribs and the collar. In this manner, tensile and compressive forces are prevented from being applied to the material surrounding the preformed hole, thereby preventing creep, common among such relatively soft materials, from decreasing the clamp load and causing the fastening connection to become loose and unsatisfactory.

Accordingly, the present invention operates to provide an efficient, strong, and low cost sheet metal insert for anchorage applications in relatively soft materials.

While it is apparent that the preferred embodiments of the invention disclosed are well calculated to provide the advantages and features stated, it will be appreciated that the invention is susceptible to modification, variation, and change without department from the proper scope or fair meaning of the subjoined claims.

What is claimed is:

1. A sheet metal insert for use in anchorage and fastening applications comprising:
a substantially cylindrical body portion with a collar at one end and two legs projecting downward from the other end, said legs having inwardly projecting and substantially helically orientated ribs defining internal threads having imperforate leading and following flanks to correspond to and receive an externally threaded male fastening member, said legs including a plurality of formed teeth-like tangs disposed on either side of said legs to form an acute angle from the downward end of said legs, said tangs being formed progressively longer along said legs away from said collar, said legs being displaced sufficiently inwardly along the axis of said body to prevent said tangs from interfering with installation of said insert in a preformed hole, said male fastening member being cooperable with said legs to force them laterally and embed said tangs into the wall of said preformed hole in which said insert may be located, said legs moving in an arc-like direction when forced outward by said male fastening member thereby pulling said sheet metal insert and thus said collar downward and firmly into abutting contact with the surface of a workpiece that contains said preformed hole.

* * * * *